3,337,013
ELECTROMAGNETICALLY CONTROLLED CLUTCH AND BRAKE ORGANIZATION

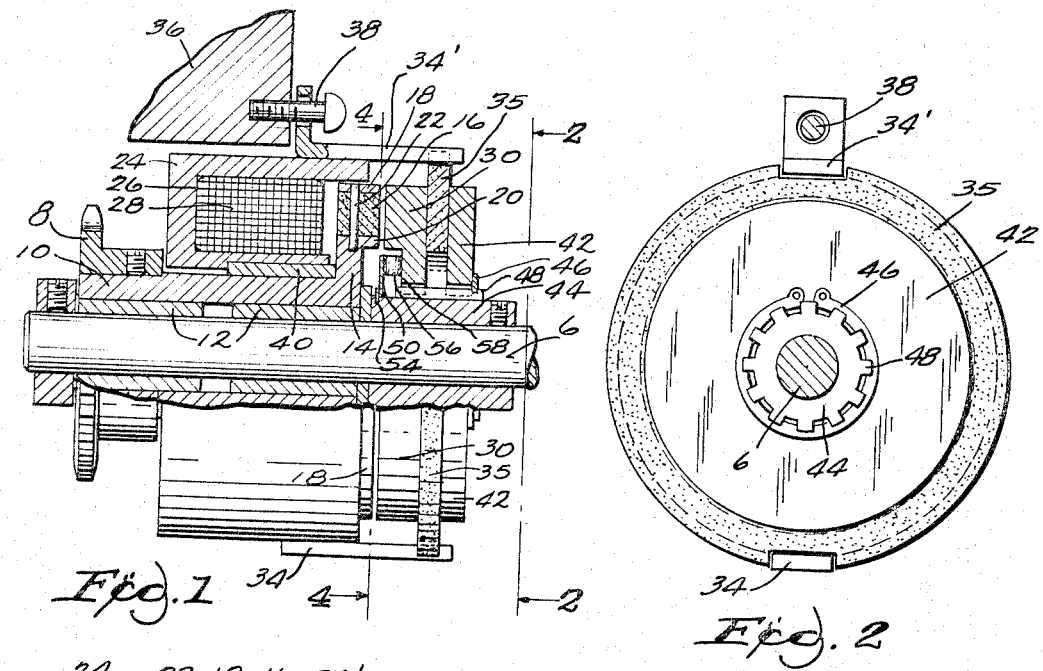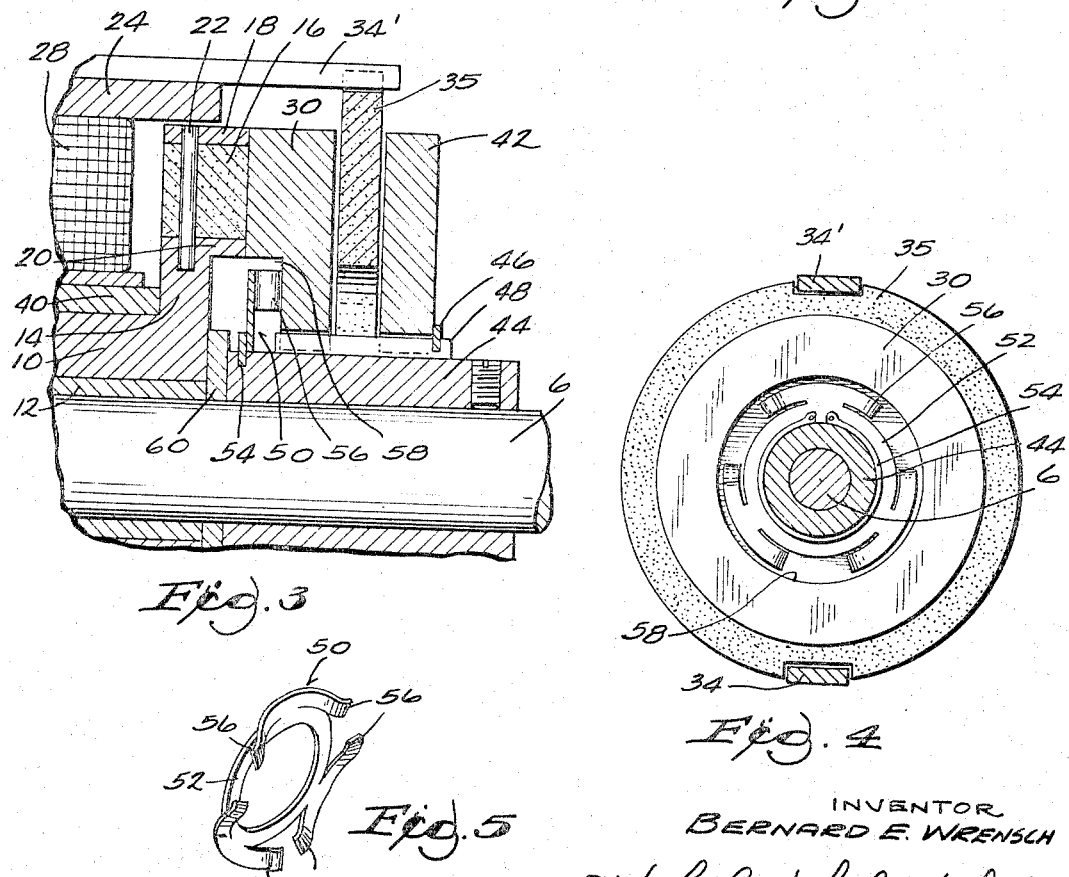

Bernard E. Wrensch, Brookfield, Wis., assignor to Stearns Electric Corporation, Milwaukee, Wis., a corporation of Wisconsin
Filed Aug. 23, 1965, Ser. No. 481,788
6 Claims. (Cl. 192—18)

This invention relates to an electromagnetically controlled clutch and brake organization.

For braking a driven shaft, a pair of disks splined to a hub on said shaft is normally clamped under spring pressure upon an intervening floating stationary disk. One of the two disks splined to the hub serves as an armature for an electric magnet which, when energized, overcomes the spring bias to clutch the armature disk to a driving rotor coaxial with the shaft. At the same time the braking action is released because the armature disk is retracted from engagement with the non-rotatable brake disk.

In the drawings:

FIG. 1 is a view in axial section through an embodiment of the invention.

FIG. 2 is a view taken in section on the line 2—2 of FIG. 1.

FIG. 3 is an enlarged fragmentary detail view in the plane of FIG. 1 showing the position of the parts when the magnet is energized.

FIG. 4 is a view taken on the line 4—4 of FIG. 1.

FIG. 5 is a perspective showing the spring on reduced scale.

It will be understood that the specific embodiment selected for exemplification of the invention may be modified in many respects while still employing the subject matter of the appended claims.

In the instant device, a driven shaft is shown at 6. Means for driving the shaft comprises a rotor which includes a sprocket 8, a hub 10 supported on bearings 12 from shaft 6, and having a clutch flange 14.

The clutch flange 14 carries a ring 16 of friction material between an outer annular polar extension 18 and an inner annular polar extension 20. A relatively non-magnetic pin at 22 may extend radially through the annulus 16 to anchor the outer polar extension 18 to metallic hub parts of the rotor.

The non-rotatable magnet frame 24 has an annular channel at 26 for the electrical winding 28. When the winding is energized by the usual electrical connections (not shown) it magnetizes the outer annular pole extension 18 and the inner anular pole extension 20 to attract an armature disk 30 into engagement with the friction clutch material 16.

The magnet frame has a plurality of projecting arms 34, 34′ to which the non-rotatable brake disk 35 is splined. A bearing as exemplified by bushing 40 preferably intervenes between the magnet body and the rotor hub 10 so that the magnet body may be held against rotation notwithstanding that the whole assembly is supported on shaft 6. The arm 34′ may be elbowed and loosely fixed against rotation by screw 38 in some fixed body 36.

The armature disk 30 and opposing brake disk 42 are both splined to a hub 44 on driven shaft 6. A split ring 46 in a groove intersecting the splines 48 limits the axially outward movement of brake disk 42. The armature disk 30 is subject to bias of a spring generically designated by reference character 50 and shown in detail in FIG. 5 in the preferred form in which it is used. The spring includes a central annulus 52 which encircles the hub 44 and abuts a stop collar 54. Connected to the periphery of the central annulus 52 are integral spring arms 56 which are formed to project axially from the plane of annulus 52 and which engage armature 30 in an undercut recess 58 with which the armature is provided, the spring arms being housed within this recess.

As already indicated, the relatively non-rotatable disk 35 splined to the arms 34, 34′ floats between the armature disk 30 and the complementary brake disk 42. Under the bias of the spring 50, the stationary disk 35 is normally subject to the friction of the armature disk 30 and the complementary brake disk 42 both of which are splined to the hub 44 on the driven shaft. Since the pressure is balanced through the split rings 54 and 46 and the intervening hub 44, the connections between the hub and the driven shaft are not subject to pressure when the brake is active.

When the winding 28 is energized to magnetize the polar extensions 18 and 20, the resulting attraction of the armature disk 30 causes the armature to move against the bias of spring 50 from the position of FIG. 1 to the position of FIG. 3, thereby releasing the brake mechanism by disengaging the armature from the floating brake disk 35. At the same time, this movement of the armature renders the driving clutch mechanism active by engaging the armature with the friction insert 16 in the flange 14 on the driving rotor hub 10, as shown in FIG. 3. Thus the brake is released and driving torque is communicated from sprocket 8 through the rotor and the armature disk 30 to the driven shaft 6.

De-energization of the winding 28 immediately relieves the attraction of the polar extensions for the armature, whereupon the armature responds to the bias of spring 50 to resume braking action by clamping brake disk 26 between the armature disk 30 and the complementary disk 42, both of which are splined or keyed to the driven shaft.

As disclosed, the embodiment selected to exemplify the invention includes an armature which serves as a component part of brake mechanism when actuated in one direction and serves as a component part of the clutch mechanism when electromagnetically actuated in the opposite direction. A spring biases the armature toward its braking position. In this position the axial pressures are in balance throughout the braking mechanism. An electromagnet actuates the armature toward its clutch effectuating position. In so doing, it overcomes the bias of the spring to release the brake as incident to the engagement of the clutch mechanism. Since the pressures are not balanced under these conditions, a thrust washer is preferably employed at 60.

I claim:

1. A clutch and brake mechanism comprising a coaxial rotor and driven shaft, the rotor being provided with magnetic pole means and a clutch surface, a stationary electromagnet constituting means for energizing the pole means of the rotor, an armature positioned to be attracted by the pole means into engagement with the said clutch surface, a spring biasing the armature away from said surface, and a relatively non-rotatable brake element normally engaged by the armature subject to the bias of said spring, the armature having splined connection with the driven shaft, the driven shaft being provided with spline means upon which the armature disk is mounted and with a seat for the spring which biases the armature disk away from the rotor, whereby the said armature disk and spring seat and spring all rotate in unison, a second disk mounted on the driven shaft in spaced relation to the armature disk, the driven shaft having means for limiting the spacing between the armature disk and the second disk, said brake elements comprising a third disk being interposed between the armature disk and the second disk and being provided with a mounting upon which it floats for movement axially of the driven shaft, said mounting including means for restraining the brake disk from rotation.

2. A clutch and brake assembly comprising a coaxial rotor and driven shaft, a hub on the driven shaft, brake mechanism including at least three disks, two or which are spaced on the hub and another of which is between the two disks thus spaced, means for restraining the latter disk from rotation, a brake spring having a seat on the hub and acting on one of said disks and adapted to urge the three disks into operative braking engagement, the disk remote from the spring being provided with a stop whereby axial pressures in the brake mechanism are balanced, electromagnetic clutch mechanism including a rotor hub having magnetizable poles for which the disk proximate the spring constitutes an armature as well as a clutch disk, a thrust washer between the rotor and the hub and means including a fixed electromagnet for energizing said poles.

3. A clutch and brake combination which comprises a relatively fixed magnet frame having arms projecting therefrom, a rotor and bearing means upon which it is rotatable within said frame, said rotor including a flange having inner and outer polar extensions proximate the respective arms, a fixed coil within said frame for energizing said magnet frame and arms and thereby rendering the polar extensions magnetic, friction clutch facing carried by said flange, an armature exposed to the magnetization of the polar extensions and constituting a driven friction clutch disk engageable with said facing when the polar extensions are magnetized, a spring having a seat mounted on the driven shaft and rotatable with the armature, said spring biasing the armature away from said polar extensions to free it from contact with the friction facing when the extensions are demagnetized, the armature being in splined connection with the driven shaft, and a relatively non-rotatable disk having a mounting supporting it in proximity to the armature to be engaged thereby by the bias of said spring for braking the driven shaft when the polar extensions are demagnetized.

4. A clutch and brake assembly comprising an annular magnet frame having inner and outer poles, a winding on the frame for magnetizing the poles, a hub rotatably mounted in the magnet frame and having a clutch flange, driving means connected with the hub, inner and outer polar extensions mounted on the clutch flange and in proximity to the poles of the magnet frame, a shaft rotatable within the hub, a second hub upon the shaft, axially spaced stops on the second hub, an axially acting spring seated against one said stop at the end of the hub which is proximate the hub first mentioned, an armature clutch and brake disk splined to the second hub and provided with a seat engaged by said spring to be biased thereby away from said polar extensions, said disk being adapted to be attracted by said polar extensions in opposition to the bias of said spring, a second brake disk mounted on the second mentioned hub against the stop remote from the first mentioned hub, a non-rotatable and axially floating brake disk between the armature disk and the second brake disk, and guide means extending axially of said shaft and to which the floating brake disk is splined, the spring bias normally engaging the floating brake disk frictionally between the disks mounted on the second hub.

5. A clutch and brake assembly according to claim 4 in which the armature disk has an annular recess within which said spring is disposed.

6. A clutch and brake assembly according to claim 4 in which the second brake disk is splined to said hub.

References Cited
UNITED STATES PATENTS

| | | | |
|---|---|---|---|
| 2,690,819 | 10/1954 | Meyer | 192—84 X |
| 2,899,037 | 8/1959 | Pierce. | |
| 2,950,795 | 8/1960 | Fischer | 192—18.2 X |
| 2,970,681 | 2/1961 | Timmcke | 192—111 |
| 2,973,850 | 3/1961 | Jaeschke | 192—111 X |
| 3,088,567 | 5/1963 | Fischer et al. | 192—84 |
| 3,093,227 | 6/1963 | Straub et al. | 192—84 |

MARK NEWMAN, *Primary Examiner.*

ARTHUR T. McKEON, DAVID J. WILLIAMOWSKY,
*Examiners.*